J. W. RAAB AND R. EDWARDS.
AUTOMOBILE VENTILATOR.
APPLICATION FILED APR. 12, 1920.
1,346,383.
Patented July 13, 1920.
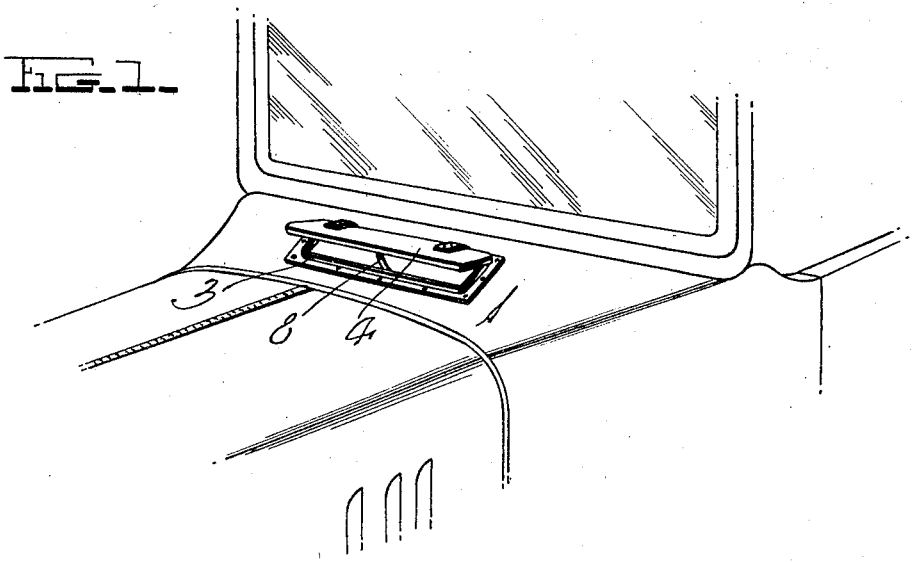
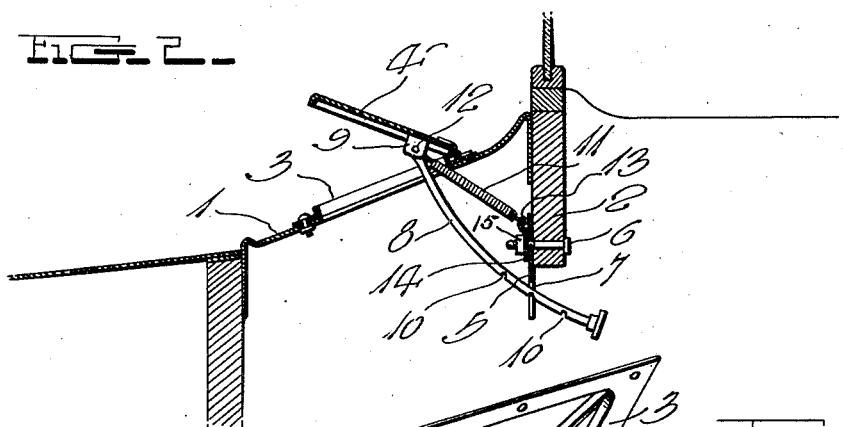
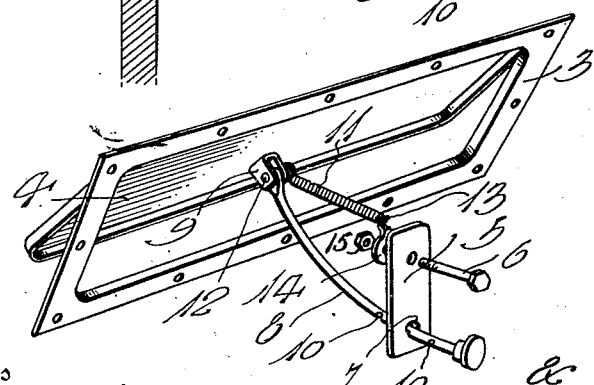
Witness
H. Woodard
Inventors
J. W. Raab
R. Edwards
By H. R. Wilson &co.
Attorneys

UNITED STATES PATENT OFFICE.

JOHN W. RAAB AND RILEY EDWARDS, OF MAQUOKETA, IOWA.

AUTOMOBILE-VENTILATOR.

1,346,383.

Specification of Letters Patent.   Patented July 13, 1920.

Application filed April 12, 1920. Serial No. 373,199.

*To all whom it may concern:*

Be it known that we, JOHN W. RAAB and RILEY EDWARDS, citizens of the United States, residing at Maquoketa, in the county of Jackson and State of Iowa, have invented certain new and useful Improvements in Automobile-Ventilators; and we do declare the following to be a full, clear, and exact description of the invention, such as will enable others skilled in the art to which it appertains to make and use the same.

This invention relates to improvements in automobile ventilators, and it has more particular reference to a device of this class which includes a door, which serves to cover an opening formed in the windshield cowl, whereby, when it is swung upwardly and held in open position, the currents of air contacting it will be directed downwardly and rearwardly through the opening in the cowl and into the interior of the car, thus serving as a means to cool the passengers' and driver's feet during warm weather.

The object of the invention is to provide a device of the above mentioned character which is simple and effective; one which is extremely easy to operate and which will remain in operative position even though subjected to severe jarring; one which has means incorporated with it to prevent rattling, and one in which the door may be moved to, and held in various positions to admit more or less air as may be desired.

Other objects and advantages of the invention will become apparent during the course of the following description.

In the accompanying drawings forming a part of the specification and in which like numerals are employed to designate like parts throughout the same:

Figure 1 is a perspective view of a portion of an automobile equipped with our improved ventilator.

Fig. 2 is a central longitudinal sectional view of Fig. 1, disclosing more clearly the manner in which our ventilator is associated with the dashboard and cowl.

Fig. 3 is an enlarged perspective view of a ventilator constructed in accordance with our invention, the same being shown removed from the automobile.

In the drawings, wherein for the purpose of illustration is shown a preferred embodiment of our invention, the numeral 1 indicates the windshield cowl of a Ford automobile, and the numeral 2 indicates the cowl-dash, or dashboard.

In carrying out our invention, we form a rectangular opening or hole in the cowl 1 and surround the opening with a substantially rectangular frame 3 which is secured in position in any suitable way. A door, or cover-plate 4 is hingedly connected to the rear portion of the frame, in such a position that when it is swung upwardly and held in open position, it will direct the air coming in contact with it downwardly and rearwardly through the opening and thence into the interior of the car against the feet and legs of the occupants of the front seat.

The door 4 is operated by novel means of simple, inexpensive construction. This means includes a small plate 5 which is adapted to be secured to the dashboard 2 by means of a bolt 6, so that a portion of said plate will depend below the bottom edge of the dashboard, and this portion is provided with an opening 7. This plate 5 serves as a means for retaining an arcuate operating rod 8 in different adjusted positions. To describe this feature more clearly, it is to be stated that the curved rod 8 has pivotal connection at one of its ends between spaced ears 9 secured to the inner face of the door 4, and the opposite end of the rod is provided with a plurality of notches 10, and this end of the lever extends through the opening 7 in the plate 5, the notches being adapted to engage the edge of the opening, whereby the door 4 is supported in open position.

The rattling of the parts of the device, is prevented to some extent by the employment of a coil spring 11 which is connected at one of its ends to the pivot pin 12 and at its opposite end to a finger 13 of a washer-like member 14, which is disposed between the nut 15 on the bolt 6, and the plate 5. This spring not only serves to prevent excessive rattling of the parts of our ventilator, but it also serves to retain the notches 10 in effective engagement with the edges of the opening 7, and it further serves to automatically close the door 4 and retain it in effective closed position, when the rod 8 is moved to a position to permit closing of the door.

The parts of our ventilator are of such construction that they may be easily and readily applied for use upon automobiles now in use, by inexperienced persons.

When the door of the device is closed, it will be held tight and rain will be prevented from gaining entrance because of such tight closure, this being effected by the employment of the already described coil spring. The construction of the device is also such that the door thereof may be opened to a position to admit more or less air, as the occasion may demand.

By the employment of a device constructed in accordance with our invention it will be seen that air will be deflected downwardly and rearwardly into the interior of the car, thus making riding more comfortable in extreme warm weather.

It is believed, that upon carefully considering the foregoing description in connection with the accompanying drawings, thorough understanding of the advantages and operation of our ventilator will be had, therefore, further description is deemed unnecessary.

We claim:

The combination with a dashboard and a windshield cowl, the latter being provided with an opening, of a frame secured to the cowl and surrounding the opening, a door hinged to the rear portion of the frame, being adapted to be swung upwardly to admit air, a plate secured to and depending from the dashboard, the depending portion thereof being apertured, an arcuate door operating rod, having pivotal connection at one of its ends with the door, the opposite end thereof extending through the aperture in the plate and having this portion formed with notches which interlock with the aperture, and a coiled spring, connected at one of its ends with the door and at its other end with the plate.

In testimony whereof we have hereunto set our hands.

JOHN W. RAAB.
RILEY EDWARDS.